United States Patent
Ding et al.

(10) Patent No.: US 9,934,051 B1
(45) Date of Patent: Apr. 3, 2018

(54) ADAPTIVE CODE GENERATION WITH A COST MODEL FOR JIT COMPILED EXECUTION IN A DATABASE SYSTEM

(71) Applicant: Futurewei Technologies, Inc., Plano, TX (US)

(72) Inventors: Yonghua Ding, San Jose, CA (US); Jason Yang Sun, Palo Alto, CA (US); Li Zhang, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/489,568

(22) Filed: Apr. 17, 2017

(51) Int. Cl.
   *H03M 7/34* (2006.01)
   *G06F 9/455* (2018.01)
   *G06F 9/45* (2006.01)
   *G06F 17/30* (2006.01)

(52) U.S. Cl.
   CPC ........... *G06F 9/4552* (2013.01); *G06F 8/443* (2013.01); *G06F 17/30474* (2013.01)

(58) Field of Classification Search
   CPC ... G06F 9/4552; G06F 17/30474; G06F 8/443
   USPC ........................................................ 341/51
   See application file for complete search history.

(56) References Cited

U.S. PATENT DOCUMENTS

| 5,301,317 A * | 4/1994 | Lohman ............ G06F 17/30463 |
| 8,880,511 B2 * | 11/2014 | Kim .................. G06F 17/30979 |
| | | 707/719 |
| 9,477,707 B2 * | 10/2016 | Chi .................... G06F 17/30442 |
| 9,594,781 B2 * | 3/2017 | Ghodsnia .......... G06F 17/30306 |

* cited by examiner

*Primary Examiner* — Brian Young
(74) *Attorney, Agent, or Firm* — Vierra Magen Marcus LLP

(57) ABSTRACT

The disclosure relates to technology for query compilation in a database management system. A first execution time of code for at least one database query without applying a code generation method is estimated and in response to receiving the at least one database query, and for one or more code generation methods, a compilation cost and a second execution time of the code as modified by the code generation methods is estimated. A cost savings for each of the one or more code generation methods is calculated, where the cost savings is calculated as the first execution time less the second execution time of the code generation method, less the compilation cost of the code generation method. One of the code generation methods or the no code generation method with the highest cost savings is then selected.

18 Claims, 8 Drawing Sheets

```
/* pseudo generated code by method 1 */
s1=0, s2 = 0, ..... s100=0;
for (n=0; n < n_rows; n++) {
    v1 = get_column_value(c1);
    s1 = s1 + v1;
    v2 = get_column_value(c2);
    s2 = s2 + v2;
    ......
    v100 = get_column_value(c100);
    s100 = s100 + v100;
}
```

```
/* pseudo generated code by method 2 */
for (n=0; n < n_rows; n++) {
    for (i=0; i < 100; i++) {
        value = get_column_value(c[i]);
        call jitted_sum_agg(value);
    }
}
```

ADAPTIVE CODE GENERATION WITH A COST MODEL FOR JIT COMPILED EXECUTION IN A DATABASE SYSTEM

BACKGROUND

The Central Processing Unit (CPU) cost of query execution is getting more critical in modern database systems, such as when slow disk accesses are largely avoided with the adoption of solid-state drive (SSD) devices. Just-in-time (JIT) compilation is an approach used to improve the CPU performance in a database system. JIT compilation refers to a compilation scheme or method in query execution performed during execution of a program, at run-time, rather than prior to execution. By producing query-specific machine code at runtime, the overhead of traditional interpretation can be avoided.

The effectiveness of JIT compiled query execution depends on the cost of the JIT compilation and the quality of the compiled code. Analytic tools such as Netezza and ParAccel dynamically generate C code for JIT compiled query execution, while tools such as Cloudera Impala and VitesseDB use a low level virtual machine (LLVM) intermediate representation (IR) builder to generate LLVM IR for JIT compiled query execution. In each case, online analytical processing (OLAP) workloads are targeted, where the OLAP workloads typically include large data sizes that benefit from the JIT compiled query execution. However, workloads with a smaller data size often result in a performance degradation with JIT compiled execution. Thus, often times the best solution depends on the data size of the workload weighed against the JIT compilation cost. Accordingly, a challenge with the JIT compiled query execution is to generate efficient code as well as to reduce the JIT compilation cost for a specific query.

BRIEF SUMMARY

According to one aspect of the present disclosure, there is provided a method of query compilation in a database management system, including estimating a first execution time of code for at least one database query without applying a code generation method and in response to receiving the at least one database query; for one or more code generation methods, estimating a compilation cost and a second execution time of the code as modified by the code generation method; calculating a cost savings for each of the one or more code generation methods, the cost savings calculated as the first execution time less the second execution time of the code generation method, less the compilation cost of the code generation method; and selecting among one of the code generation methods and the no code generation method having a highest cost savings.

Optionally, in any of the preceding aspect, another implementation of the aspect includes comparing the cost savings of the one or more code generation methods to a previously calculated cost savings of the one or more code generation methods or the cost savings of the code without applying the code generation method, and wherein the highest cost savings is determined as the one or more code generation methods that is greater than the cost savings of a previously calculated one or more code generation methods or the cost savings of the code without applying the code generation method.

Optionally, in any of the preceding aspect, another implementation of the aspect provides that the one or more code generation methods are based on one or more optimizations to the code, the one or more optimizations including a just-in-time (JIT) compilation method.

Optionally, in any of the preceding aspect, another implementation of the aspect provides that the one or more optimizations to the generated code comprises performing at least one of register allocation, inlining, constant folding, loop strength reduction, or loop-invariant code motion.

Optionally, in any of the preceding aspect, another implementation of the aspect includes setting the cost savings of the code applying the no code generation method to zero; and estimating the first execution time of the code based on a data size of a workload the code is set to process.

Optionally, in any of the preceding aspect, another implementation of the aspect includes receiving the at least one database query; processing the at least one database query by executing the code generated with the selected code generation method or no code generation method; and outputting a result for the at least one database query based on the processed at least one database query.

Optionally, in any of the preceding aspect, another implementation of the aspect provides that the code is generated by at least one of C, C++ and low level virtual machine (LLVM) intermediate representation (IR).

Optionally, in any of the preceding aspect, another implementation of the aspect includes grouping multiple operators for a specific one of the at least one database query to generate a common function with parameters for different operators; and executing the code by calling the common function, wherein the common function is called inside a loop with a number of iterations equal to a number of the multiple operators in the at least one database query.

According to one other aspect of the present disclosure, there is provided a device for query compilation in a database management system including a non-transitory memory storage comprising instructions; and one or more processors in communication with the memory, wherein the one or more processors execute the instructions to perform operations comprising estimating a first execution time of code for at least one database query without applying a code generation method and in response to receiving the at least one database query; for one or more code generation methods, estimating a compilation cost and a second execution time of the code as modified by the code generation method; calculating a cost savings for each of the one or more code generation methods, the cost savings calculated as the first execution time less the second execution time of the code generation method, less the compilation cost of the code generation method; and selecting among one of the code generation methods and the no code generation method having a highest cost savings.

According to another aspect of the present disclosure, there is provided a non-transitory computer-readable medium storing computer instructions for query compilation in a database management system, that when executed by one or more processors, perform the steps of estimating a first execution time of code for at least one database query without applying a code generation method and in response to receiving the at least one database query; for one or more code generation methods, estimating a compilation cost and a second execution time of the code as modified by the code generation methods calculating a cost savings for each of the one or more code generation methods, the cost savings calculated as the first execution time less the second execution time of the code generation method, less the compilation cost of the code generation method; and selecting among one of the code generation methods and the no code generation method having a highest cost savings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 3A and 3B illustrate different methods of code generation.

DETAILED DESCRIPTION

The disclosure relates to technology for query compilation in a database management system.

In database query systems, query or execution plans are employed to generate code based on the query. The methods employed to generate the code may include various optimization techniques to interpret the original code. Some of these optimization techniques occur during compile time, while others occur during run time. On such technique used during run time is the aforementioned JIT compilation method.

Applying different optimization techniques (or none at all) results in differing costs and efficiencies when the code is executed. In this disclosure, a cost model is employed to select the most efficient method of code generation based on the estimation of JIT compilation cost and the estimation of performance benefit from the generated code. More specifically, using a compilation method, a compilation cost and a first execution time of executing code generated in response to a query are estimated. A first cost savings is calculated when executing the code using the compilation method, and the first cost savings is compared to a previously calculated second cost savings, associated with a second compilation method. The compilation method is selected to execute the code when the first cost savings is greater than the second cost savings, and the second compilation method is selected to execute the code when the second cost savings is greater than the first cost savings.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
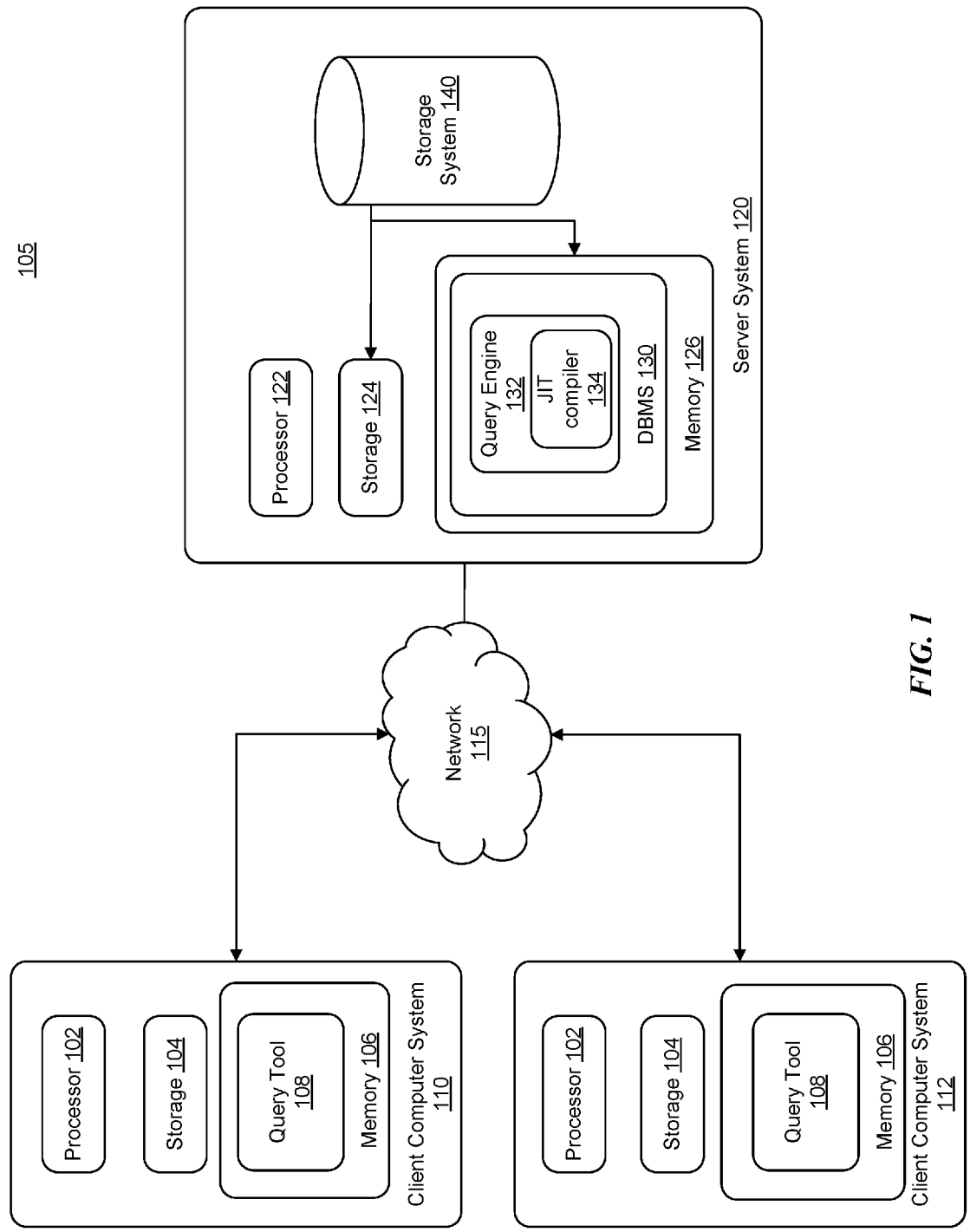
FIG. 1 illustrates an example diagram of a database management system in which query processing may be implemented.

FIG. 1 illustrates an example diagram of a database management system in which query processing may be implemented. As shown, computing environment 105 includes two client computer systems 110 and 112, a network 115 and a distributed server system 120. The computer systems illustrated in environment 105 are included to be representative of existing computer systems, e.g., desktop computers, server computers, laptop computers, tablet computers and the like. However, embodiments of the invention are not limited to any particular computing system, application or network architecture and may be adapted to take advantage of new computing systems as they become available. Additionally, those skilled in the art will recognize that the computer systems illustrated in FIG. 1 are simplified to highlight aspects of the present embodiments and that computing systems and networks typically include a variety of additional elements not shown. For example, the system is not limited to two client computing systems or a single server, but may include any number of systems and servers.

Client computer systems 110 and 112 each include, for example, a processor 102, storage 104 and memory 106, typically connected by a bus (not shown). Processor 102 is, for example, a programmable logic device that performs the instructions and logic processing performed in executing user applications. Although illustrated as a single processor, the processor 102 is not so limited and may comprise multiple processors. The processor 102 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 102 may be configured to implement any of the schemes described herein, such as the processes illustrated in FIGS. 4, 5 and 6A-6D, using any one or combination of steps described in the embodiments. Moreover, the processor 102 may be implemented using hardware, software, or a combination of hardware and software.

Storage 104 may store application programs and data for use by client computer systems 110 and 112. Storage 104 includes hard-disk drives, flash memory devices, optical media and the like.

Client computer systems 110 and 112 may also run a query tool 108, which is stored in memory 106. The memory 106 is illustrated as a single memory, although memory 106 may be implemented as a combination of read only memory (ROM), random access memory (RAM), or storage 104 (e.g., one or more disk drives or tape drives used for non-volatile storage of data). In one embodiment, query tool 108 may allow a user to compose a query, where query tool 108 is configured to automatically determine Boolean logic and generate a predicate, for example, as a Boolean expression. Additionally, query tool 108 may be configured to transmit a query over network 115 to server system 120 for execution by a database management system (DBMS) 130. In embodiments, the network 215 may comprise the Internet, though other networks including, but not limited to, a LAN or WAN are contemplated. Computer systems 110/112 and server system 120 may be connected to each other by direct wireless personal area networks (WPANs) and/or peer-to-peer connections in addition to, or instead of, their connection to network 115.

Server system 120 includes, for example, a processor 122, storage 124 and memory 126. Storage 124 also includes a storage system 140 (or database). Storage system 140, although depicted as part of the server system 120, may also be located outside of the server system 120 and communicatively coupled to the network 115. Moreover, it is appreciated that there may be more than one storage system (or database), and that the storage system may be any type of known database, database system, data stores, and the like.

In one embodiment, the DBMS 130 is a software application configured to manipulate the information in storage system 140. For example, DBMS 130 may be configured to add, delete, modify, sort, display and search for specific information stored in storage system 140. In the depicted embodiment, DBMS 130 includes a query engine 132 which represents the instructions or routines included in DBMS 130 that evaluate logical operators and query conditions, according to a set of rules as described herein.

The query engine 132 includes a just-in-time (JIT) compiler 134. In various embodiments, the query engine 132 can utilize the JIT compilation module 134 to generate code on-the-fly, for each specific query that is submitted, rather than using generic execution code for all possible queries. The queries can be submitted, for example, by a user operating a client computer system 112 to interact with an interface. By generating code on-the-fly, the query execution engine 132 can allow for specific optimizations to be performed that are tailored with respect to the query and to the computing system on which the query is to be executed, thereby helping achieve optimal query execution performance. For instance, function inline and loop fusion may be used to generate the code.

In one embodiment, the query tool 108 generates a query from user-specified query conditions. The queries generated by query tool 108 may be used to retrieve data from storage system 140. However, in one embodiment, query tool 108 does not require the user to specify any Boolean logical operators or to determine the order and precedence used by DBMS 130 and query engine 132 to evaluate and reduce the query conditions.

Figure 2:
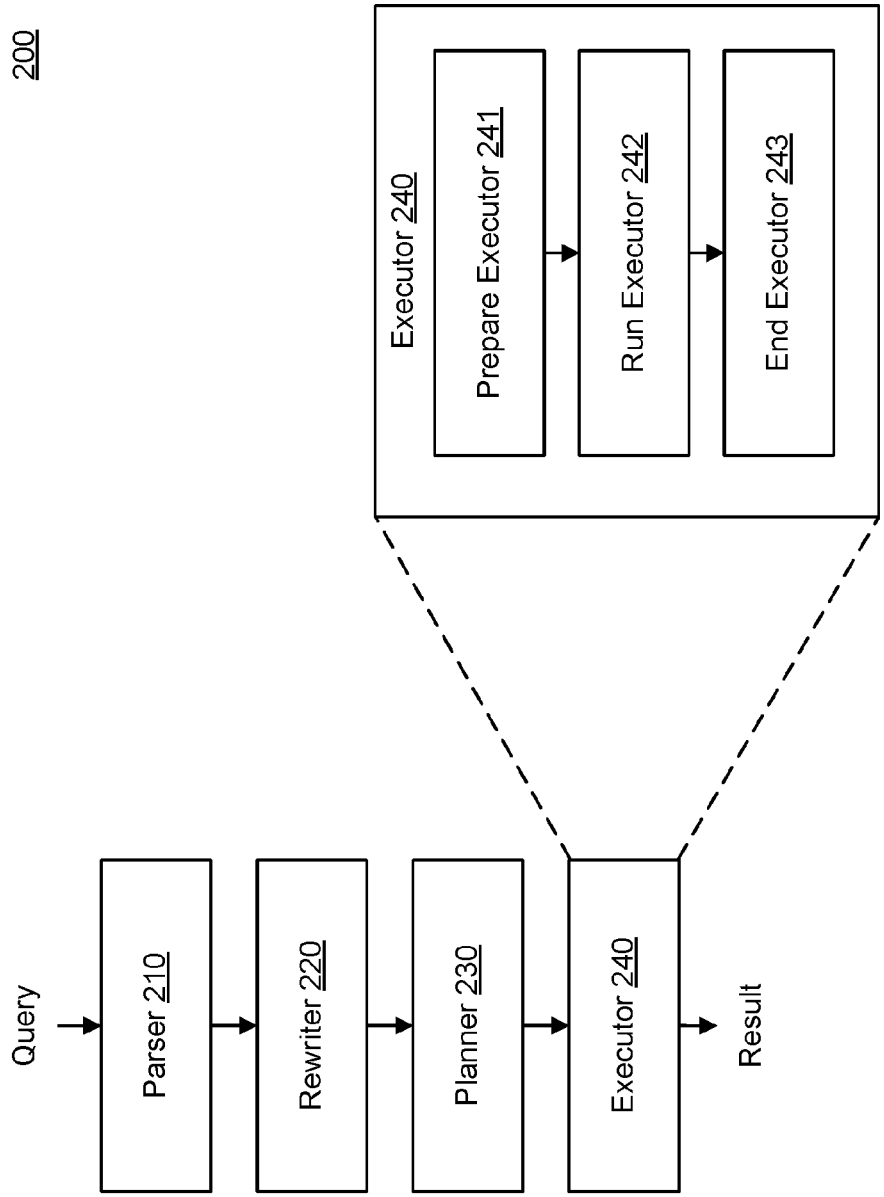
FIG. 2 shows an example of a framework 200 of query processing in a database management system (DBMS) of FIG. 1.

FIG. 2 shows an example of a framework 200 of query processing in a database management system (DBMS) of FIG. 1. An incoming query is first parsed by a parser 210 by performing semantic checks on the query to ensure that it is well formed. Upon completion of parsing, a parse tree or query tree is output that represents the logical steps necessary to execute the requested query.

The rewriter (or transformer) 220 takes the parsed query, typically in the form of query blocks nested or interrelated to each other, output from parser 210 The rewriter 220 primary objective is to determine whether it is advantageous to change the form of the query so that it enables generation of a better query plan. Several different query transformation techniques may be employed by the rewriter 220, such as view merging, predicate pushing, query rewrite with materialized views, subquery unnesting, etc.

Planner (or optimizer) 230 determines an efficient execution mechanism in which to execute a given query by considering possible query plans (or execution plans). This is accomplished, for example, using the parse tree previously created along with statistical information about the data, to generate one or more query plans for each query, each of which may be a mechanism used to run a query. Various decisions made by the planner 230 are based on calculated costs of an execution plan, in terms of CPU processing and input/output (I/O), along with how fast the query may be executed (i.e., a cost-based plan). In general, the execution plans are then evaluated and the lowest-cost plan (i.e., execute fasters and use least amount of resources, CPU and I/O) is often, but not always, selected.

As appreciated, different types of compilers exist. A static or compile-time planner optimizes a query at the time it is being compiled, thereby avoiding additional overhead at run-time, and potentially assessing a larger number of query execution plans since cost computation is less critical. Dynamic query planners, on the other hand, select execution plans at run-time, thereby benefiting from accurate knowledge of run-time resources, host variables and result sized for sub-queries that have already been computed. JIT compilation is a form of dynamic query planning that occurs before (just in time) run-time.

Executor 140, also referred to as a query engine (such as query engine 132), performs the execution of the query plan generated and selected by the planner 230. The plan itself is an ordered set of steps used to access data in a relational database management system. Two distinct types of execution plans exist—an estimated execution plan, in which the plan represents the output from the planner, and an actual execution plan, in which the plan represents the output from the actual query execution. In one embodiment, the execution plan is changed during actual execution.

The executor 140 includes three primary phases or subcomponents: a prepare executor 141, a run executor 142 and an end executor 143. The prepare executor 141 allocates run-time data structures and prepares for the query execution, an example of which is described below with reference to FIG. 4. When a JIT compiled execution method is used (as described in detail below), the code is generated in this phase and the generated code is JIT compiled.

The run executor 142 executes the query, for example, employing an interpretation and iterator style (not shown) when a JIT compiled execution method is not utilized. If a JIT compiled execution method is employed, the runtime generated and JIT compiled/optimized code for a specific query is executed in this phase.

The end executor 143 frees run-time data structures and ends the query execution, as described below with reference to FIG. 5. Results or output of the query are returned to the requesting client or node.

The functions executed in each block above can, for example, be implemented using software that runs on a CPU or suitable processor.

FIGS. 3A and 3B illustrate different methods of code generation. For purposes of discussion, the example methods employed to generate bytecode or pseudo code 302 (CM1) (FIG. 3A) and 304 (CM2) (FIG. 3B) are compiled using different optimizations to generate different versions of the code.

It is appreciated that the example methods are non-limiting and intended to serve as a point of discussion. Any number of code generation techniques may be employed in the cost based code generation methodology discussed herein. Additionally, the pseudo code generation in the example embodiments may be implemented by the server system 120, although such implementation is not limited to this server system. Any of the disclosed components may also implement the code generation and techniques described herein.

In one embodiment, where compilation costs exceed benefits of the JIT compiled code, it may be preferable to not perform any code generation. We can choose no code generation if the JIT compilation cost cannot cover the benefit of the generated code.

In another embodiment, code generation is used to generate the code based on the original interpretation code. The original code may be specialized and optimized based on the query specific information using any number of well-known optimization techniques and may be machine-dependent or independent optimization including, but not limited to, loop optimization, dead-code elimination, removal of redundant code, etc.

In one other embodiment, the code is JIT compiled for execution. Here, run-time performance of generated code by a JIT compiler, such as JIT compiler 134 of server system 120, serves to improve the performance of programs by compiling bytecodes or pseudo code into native machine code at run time.

As code is being JIT compiled, different versions of the bytecode or pseudo code may have different costs associated with JIT compilation, as well as different resulting performance. For example, generation of code with a function inline and loop fusion may increase the amount of code, which will in turn increase the JIT compilation cost. However, the generated code may be more efficient than one without these optimizations.

Additionally, based on query specific information, the original code may be revised and different algorithms applied to generate more efficient code. For example, to handle the predicate of an "IN" expression, a hash table may be constructed for the constants in the "IN" expression and a hash search may be used instead of the conventional sequential search.

The examples below illustrate two different methods of code generation in JIT compiled execution for a query, where the query for a table data (now shown) is:

SELECT SUM(C1), SUM(C2), . . . , SUM(C100) from a table T1 in the database (an example of which is discussed in the example below).

In the example query, there are 100 sum aggregations on different columns and the columns have the same data type. This query is extracted from a real customer workload query.

A first method CM1 of code generation is to generate the code for each sum aggregation with a specific column variable. For example, if a table of data has columns C1, C2 . . . C100, then the sum aggregation of each column is the sum of all rows in that column aggregated with the value of the column. In this example, loop fusion and function inline are also applied on the original code along with code specialization. FIG. 3A represents the pseudo generated code 302 when applying method M1.

A second method CM2 of code generation is to generate a common function for all of the sum aggregations SUM (C1), SUM(C2) . . . SUM(C100). The function has a parameter for the different columns. In this example, a loop with 100 iterations (the number of sum aggregations) is generated and a function call is made to the common function in the loop body. FIG. 3B represents the pseudo generated code 304 when applying method M2.

As illustrated in FIGS. 3A and 3B, methods CM1 and CM2 of code generation result in two different versions of generated code for the example query. The generated code by method CM1 is more efficient than the one generated by method CM2. However, the JIT compilation cost on the generated code from method CM1 is higher than the JIT compilation cost on the generated code from method CM2.

To determine which of the two methods CM1 and CM2 is more efficient overall, the workload data size as well as the JIT compilation cost and the efficiency of the generated code are analyzed. The methodology that follows in the description of FIG. 4 demonstrates how to analyze these methods to obtain the most cost effective solution (i.e., a cost based model selects the best solution of code generation for JIT compiled execution).

Figure 4:
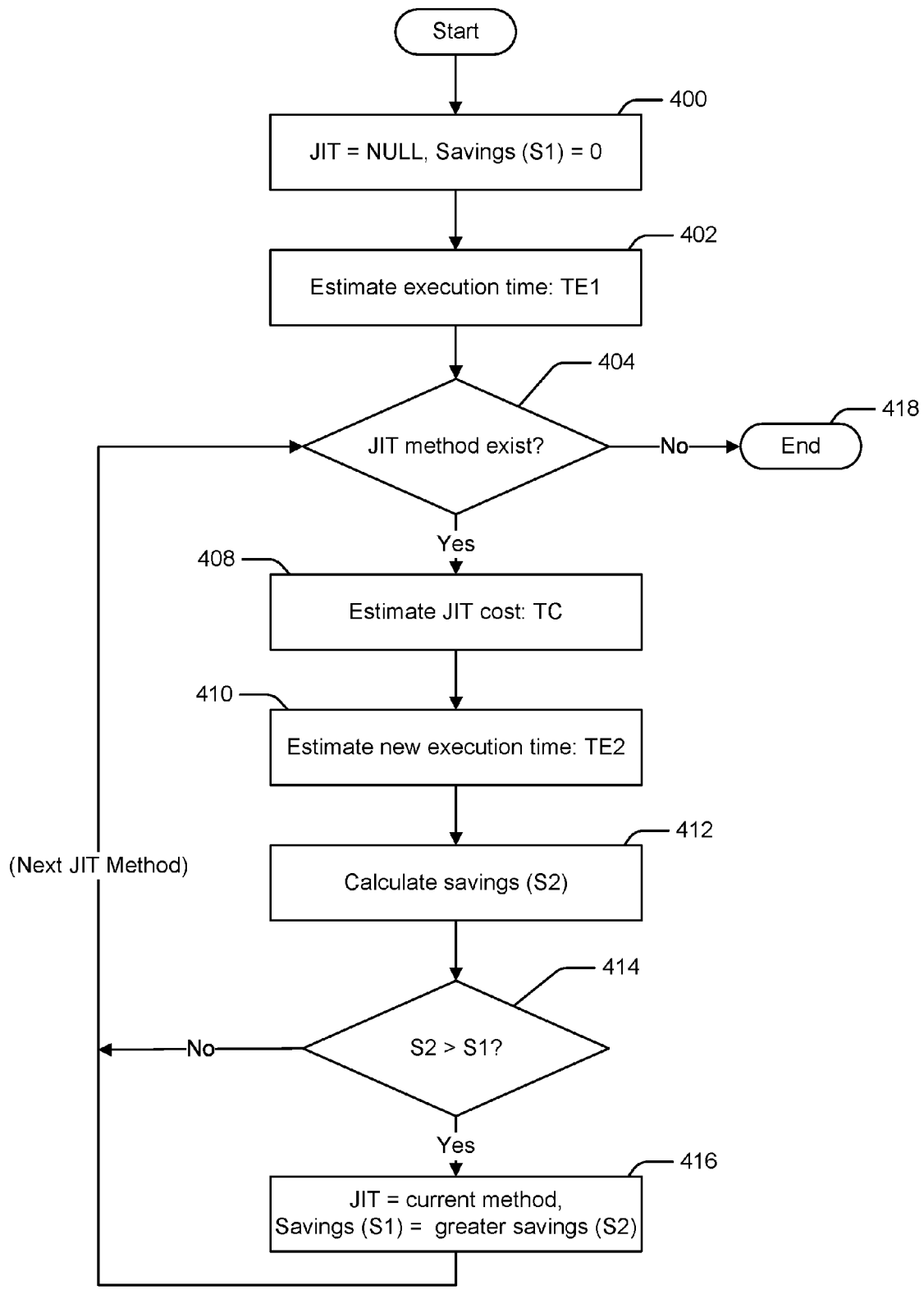
FIG. 4 illustrates a flow diagram of a cost savings model in accordance with the disclosure.

FIG. 4 illustrates a flow diagram of a cost savings model in accordance with the disclosure. The cost savings model may be implemented, for example, in server 120 depicted in FIG. 1. However, it is appreciated that any of the disclosed components may implement the cost savings model and techniques described herein.

As explained above, in JIT compiled execution, code generation is performed in the prepare executor phase 241 (FIG. 2). After code generation is completed, the JIT compilation is applied to the generated code. For an incoming query, query specific information is available to specialize and optimize the execution engine, such as query engine 132, for the execution of the query.

In the cost savings model of this disclosure, the most efficient method of code generation will be selected based on an estimation of JIT compilation costs TC and the resulting performance benefit (execution time of original code TE1–execution time of JIT compiled code TE2) from the generated code that has been JIT compiled. That is, an adaptive or dynamic method of code generation is implemented by application of a cost model for JIT compiled execution, particularly in a database or big data system such as depicted in FIG. 1.

The flow diagram illustrated in the diagram addresses the prepare executor 241 phase of query processing. That is, the parsing, rewriting and planning phases of FIG. 2 have already been processed.

The process starts at 400, where the cost model is initialized such that JIT compilation is set to NULL (i.e., no code generation) and the cost savings (performance gain) is set to zero (i.e., no savings without code generation).

At 402, the execution time TE1 of the original code without code generation and JIT compilation will be estimated. That is, TE1 is the data size of the workload (n_rows) that the code needs to process (i.e., the estimation on the number of execution time) multiplied by the execution cost (T1) of a one-time execution of the original code. Thus TE1 is estimated as n_rows*T1.

At 404, the process determines whether any JIT compilation methods exists in the JIT compiler, such as JIT compiler 134 (FIG. 1), that may be applied to the original code. If no JIT compilation method currently exists, then the process proceeds to 406, where the preparation phase of the executor ends.

If a method of code generation for JIT compiled execution exists in the JIT compiler 134, the JIT compilation cost TC of the generated code is estimated at 408 and, at 410, the execution time TE2 of the JIT compiled code is estimated. The execution time TE2 is therefore estimated as n_rows*T2, where T2 is the execution cost of a one-time execution of the generated code. That is, the estimate compilation cost TC is based on the size of the generated code (i.e., lines of generated code).

In one embodiment, costs may be estimated using statistical information stored in a database catalog, such as storage system 140 (FIG. 1). For example, costs is generally measured as a total elapsed time for answering a query, which factors may include disk accesses, CPU and network communication.

Once the JIT cost estimate TC and the execution time estimate TE2 are calculated, any performance benefits (i.e., savings) may be compared to previously calculated estimates (where the previously calculated estimates are for code generated using a different code generation technique) at 412.

In one embodiment, the estimated execution time TE1 of the original code (without code generation) has a savings S1 calculated to be zero (since the cost savings is initially set to a savings of zero, i.e., no code generation), and the subsequently processed JIT compiled code having an estimated JIT cost TC and an estimated execution time TE2 has a savings S2 calculated to be the estimated execution time TE1 less the estimated execution time TE2, less the estimated JIT cost TC (i.e., S=(TE1−TE2)−TC).

The savings S1 and S2 are then compared at 414 to determine which of the code generation methods (or no code generation method) has a greater savings. Following the example embodiment above, if the savings S2 of the JIT compiled code is greater than the savings S1 of the original code or a previous JIT compiled method, the current JIT complied method of code generation is selected as the more efficient method. Otherwise, the original code or the previously JIT compiled method is selected as the more efficient method.

At 416, the JIT compiler 132 is updated to the selected code generation method and the savings is updated to the corresponding savings (i.e., JIT=current code generation method, savings=S2 since S2 is greater than S1). Thus, in this example, the JIT method is updated to the current code generation method with higher performance benefits, and the savings S1 is updated to equal the greater of S1 or S2. In the event that the original code without code generation is determined to have a greater savings, then the JIT will remain equal to NULL.

The process is iterated (next JIT method) to determine the estimated JIT cost TC, estimated execution time TE2 and savings S2 for each existing JIT code generation method, such that the newly calculated savings S2 is compared to the previously calculated cost savings S1. When no further code generation methods are available, the cost model completes processing and the most cost effective method of code generation may be output at 418 (end, described below with reference to FIG. 5), as described below with reference to FIG. 5.

Figure 5:
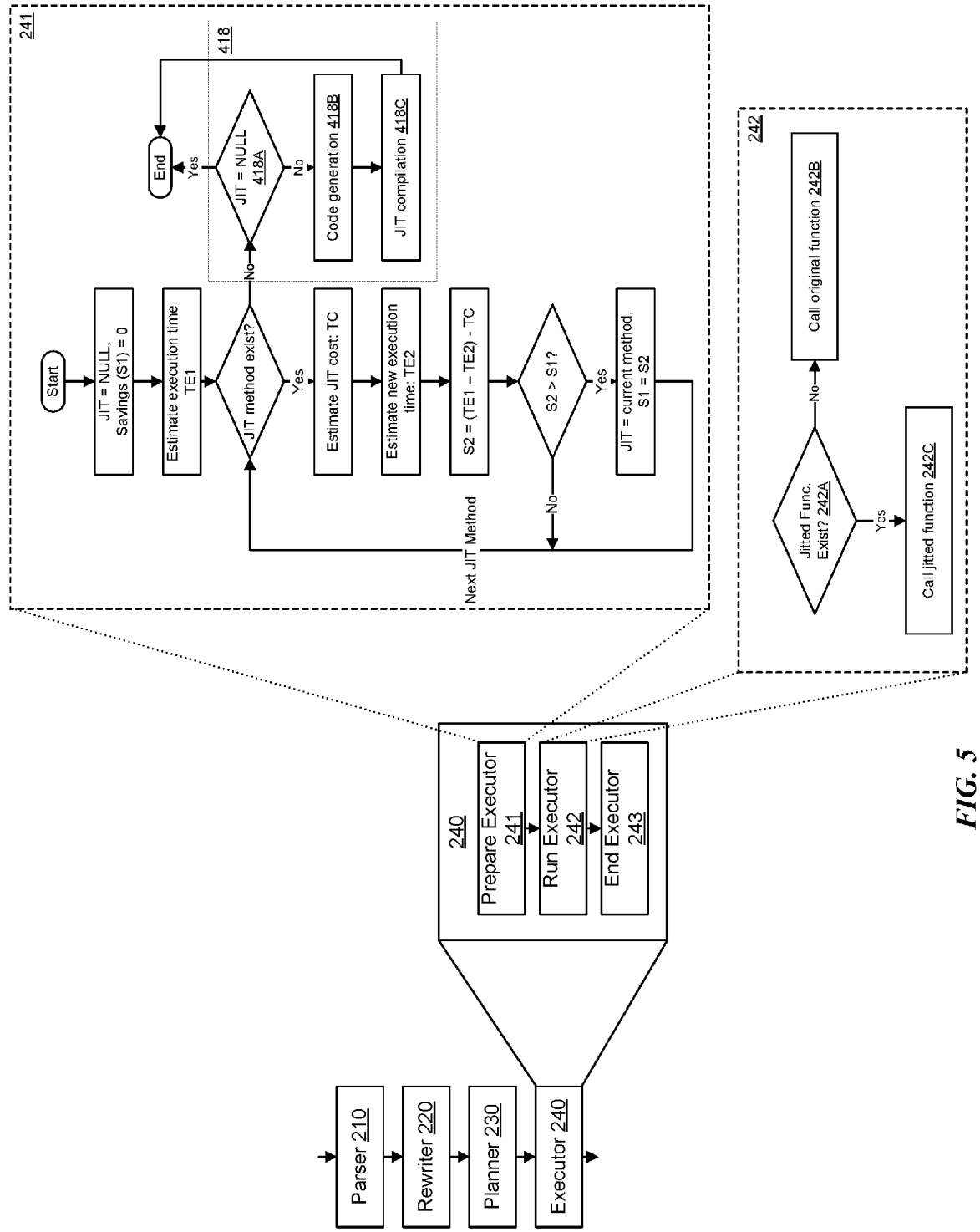
FIG. 5 illustrates a flow diagram with the output of the cost savings flow diagram of FIG. 4.

FIG. 5 illustrates a flow diagram with the output of the cost savings flow diagram of FIG. 4. The framework 200 of FIG. 2, and in particular the executor 240, shows an expanded view in which the prepare executor 241 executes the cost savings model illustrated in FIG. 4 and the run executor 242 outputs results based on execution of the most effective code based on the cost model illustrated in FIG. 4.

The run executor 242, including the output flow procedure, may be implemented, for example, in server 120 depicted in FIG. 1. However, it is appreciated that any of the disclosed components may implement techniques described herein.

As shown in the executor 240, when all JIT compilation methods have been evaluated by the cost model illustrated in FIG. 4, the JIT method is checked to determine whether JIT=NULL at 418A. If JIT≠NULL, the code is generated at 418B, the code is JIT compiled at 418C and the process ends. Otherwise, if JIT=NULL, no code generation occurs and the process ends.

Once the executor is prepared by the prepare executor 241, the run executor 242 executes the selected code generation methodology. In particular, the server 120 first determines whether a jitted function exists at 242A. The jitted function is the result of the code having been generated by the JIT compilation method. Accordingly, if the current method as determined by the cost savings model is selected as a JIT compiled code generation method, then the jitted function is called at 242C to execute the jitted function. Otherwise, if no code generation was performed, then the original function is called at 242B to execute the original code. In one embodiment, the original function 242B may be the pseudo (original) code without any code generation. In another embodiment, the pseudo function 242B may be the pseudo code having been compiled with conventional optimization techniques. The selected results are executed and the executor 240 ends processing at 243.

Figure 6A:
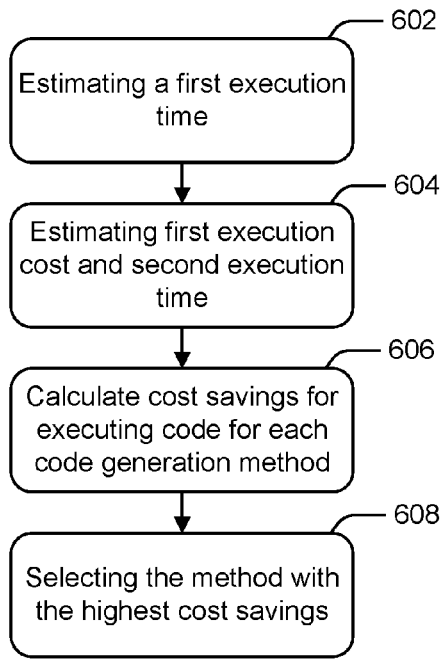
FIGS. 6A-6C illustrate flow diagrams in accordance with the cost savings model of FIG. 4.
Figure 6C:
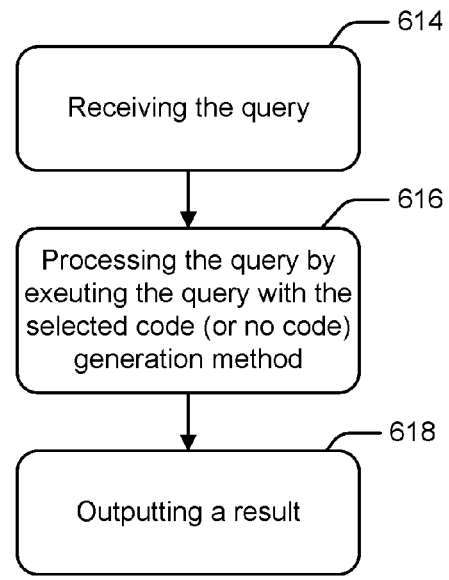
Figure 6D:
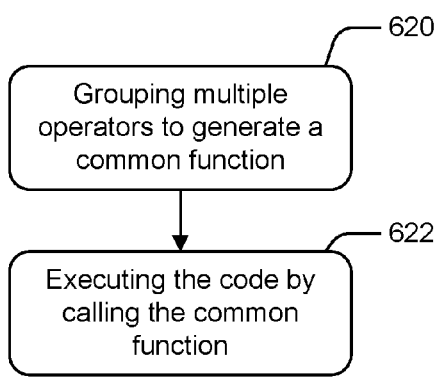
FIG. 6D illustrates a flow diagram of grouping multiple operators in accordance with the cost savings model of FIG. 4.
Figure 6B:
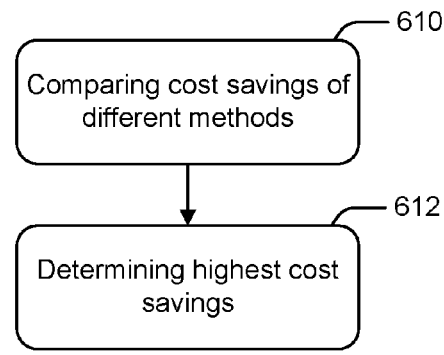

FIGS. 6A-6C illustrate flow diagrams in accordance with the cost savings model of FIG. 4, and FIG. 6D illustrates a flow diagram of grouping multiple operators in accordance with FIG. 4. The processes may be implemented, for example, in server 120 depicted in FIG. 1. However, it is appreciated that any of the disclosed components may implement the cost savings model and techniques described herein.

With reference to FIG. 6A, a process of query compilation in a database management system (DBMS) is disclosed. In general, the process determines which compilation method affords the best (optimal) performance efficiency by comparing cost savings on different code generation methodologies.

After initiation of the cost model and once JIT compilation methods exists in the JIT compiler for code generation, the server 120 estimates a first execution time TE1 of the original code at 602. At 604, the server 120 estimates the cost of JIT compilation TC and the execution time TE2 of the currently applied code generation method at 602. The cost of JIT compilation TC and the execution time TE2 may then be applied to calculate the cost savings S2 for each executing code generation method at 606. That is, for different methods of code generation, the cost model with calculated the estimate execution time TE2 and JIT compilation time TC.

The method determined to have better performance gains (i.e., highest savings) is selected as the method of code generation at 608. Accordingly, the process is able to select the most efficient code generation method from multiple code generation methods (including conventional code generation methods and no code generation).

Turning to FIG. 6B, the process illustrates an embodiment in which cost savings of the different code generation methods are compared and determined. At 610, and consistent with 418A-418C of FIG. 5, the various cost savings for the different code generation methods and the no code generation method are compared. That is, the cost savings S2 may then be compared to an earlier calculated cost savings S1, where the cost savings S1 is associated with a different code generation method than the cost savings S2. As noted above, the comparison seeks to determine which of the compilation methods provides better performance gains based on a variety of factors, such as workload size, at 612.

FIG. 6C describes the process of receiving the database query from a client computer system 112 at 614, followed by processing the database query by executing the query with the selected code (or no code) generation method at 616. For example, and with reference to FIG. 5, the server 120 determines whether a JIT compilation method of code generation or some other form of code generation (or no code generation) has been selected as the best performance gains, and the selected method is output as a response to execution of the database query (using the selected method) at 618.

Referring to FIG. 6D, the server 120 groups multiple operators for a specific query to generate a common function with parameters for different operators at 520. At 622, the code is executed by calling the common function, where the common function is called inside a loop with a number of iterations equal to a number of the multiple operators in the specific database query.

Figure 7:
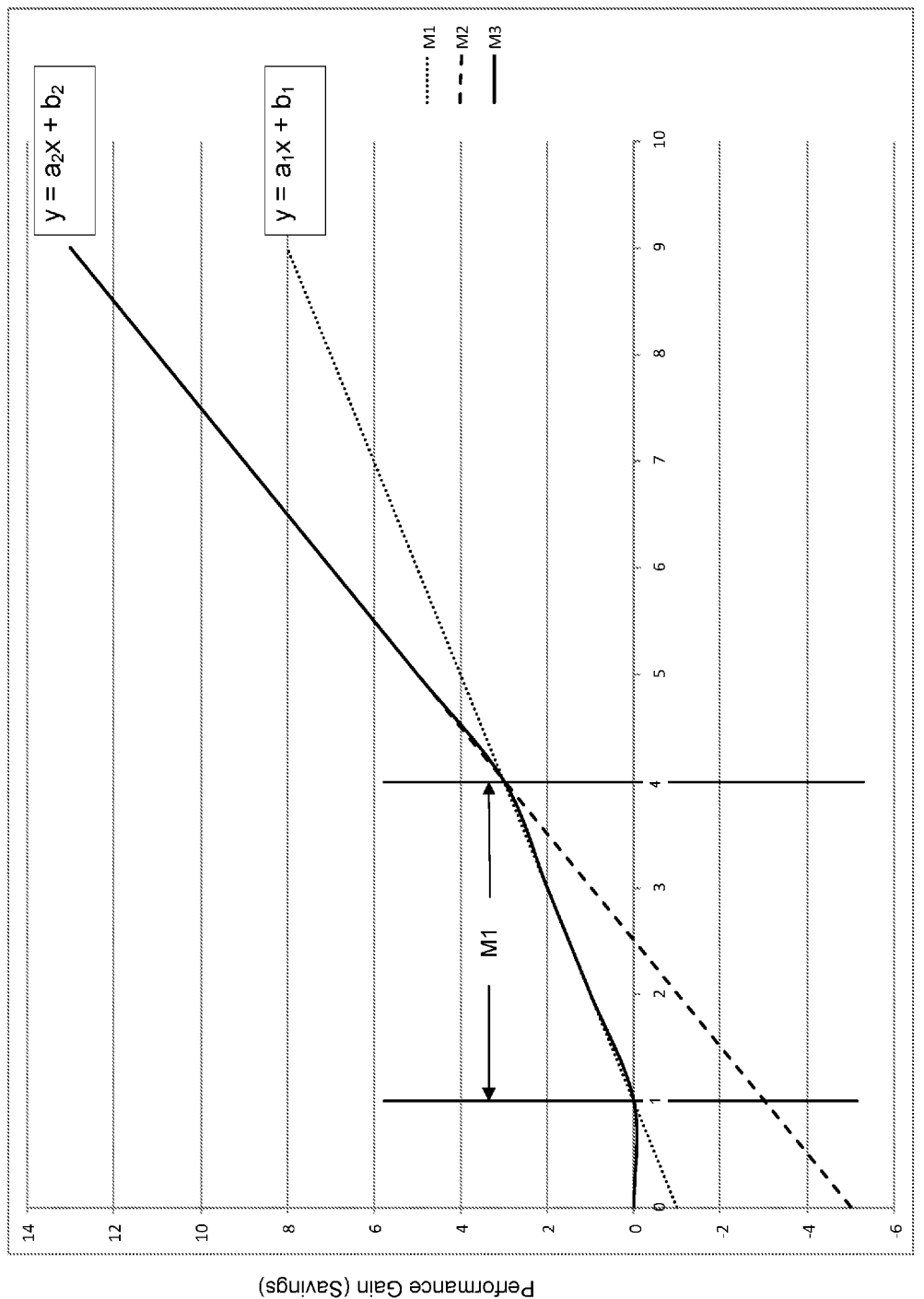
FIG. 7 illustrates a graph with performance gains against workload size employing different methods of code generation using JIT compilation.

FIG. 7 illustrates a graph with performance gains against workload size employing different methods of code generation using JIT compilation. In the illustrated example, three different schemes or methods M1, M2 and M3 of code generation are depicted. A fourth method M0, in which no code generation is employed, is also available, although not depicted in the disclosed embodiment.

A performance gain of zero measured against the workload size is the baseline performance when no code generation is employed using method M0. That is, no code generation or JIT compilation is employed. According, there are no runtime costs associated with method M0. This method may be selected, for example, when the JIT compilation cost does not cover the benefit of the generated code. In this case, the performance gain is zero (y=0).

Method M1 (depicted by the dotted lines) represents the performance gains as workload increases when employing the example pseudo code (or bytecode) 304 (CM2) generated as discussed with reference to FIG. 3B. As noted above, method M1 has less JIT compilation cost and less efficiency for the generated code than method M2.

Method M2 (depicted by the dashed lines) represents the performance gains as workload increases when employing the example pseudo code 302 (or bytecode) (CM1) generated as discussed with reference to FIG. 3A. Method M2, as noted above, has a higher JIT compilation cost and a more efficient generated code than method M1.

Applying the cost based code generation method, method M3 (depicted by the solid line), as discussed with reference to FIGS. 4, 5 and 6A-6D, one of methods M0, M1 or M2 is selected for the optimal performance according to different workload size. Method M3 is represented according to the following, where y is the performance gain, x is the workload size, a and b are constants, and N1 and N2 are the demarcation of workload size for choosing different methods (i.e. if the workload size is less than N1, M0 is selected. If the workload size is between N1 and N2, M1 is selected. Otherwise, M2 is selected):

$$y = \begin{cases} 0 & (x <= N_1) \\ a_1 x + b_1 & (N_1 < x <= N_2) \\ a_2 x + b_2 & (x > N_2) \end{cases}$$

When employing the cost based code generation method M3, the method with the highest performance gain may be selected to thereby optimize the overall process of code generation. For example, with reference to the line graph in FIG. 7, when employing the cost based code generation of method M3, method M1 has the greatest performance gain with a workload size between '1' and '4' (i.e., 1<x<=4) and is selected during this range, method M2 has the greatest performance gain with a workload size greater than '4' (i.e., x>4) and is selected during this range, and method M0 (in which no code generation is employed) has the greatest performance gain (in this case zero) when workload size drops below '1' (i.e., x<=1) and is selected during this range. The solid line representing method M3 shows the overall performance optimization when employing this methodology.

It is appreciated that the above methods are non-limiting examples, and that any number of different code generation methods may be employed, with or without JIT compilation.

Figure 8:
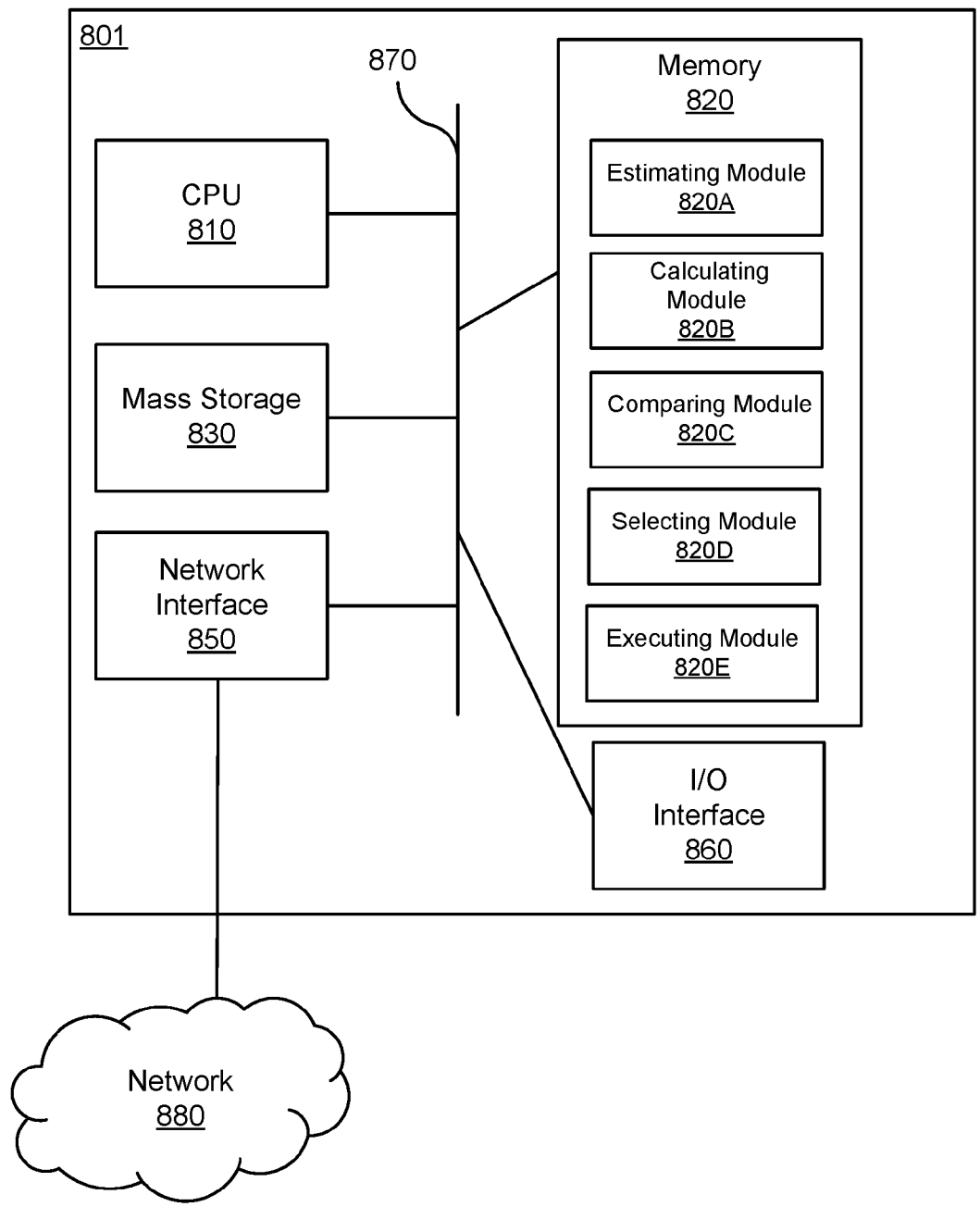
FIG. 8 illustrates a block diagram of a network system that can be used to implement various embodiments.

FIG. 8 is a block diagram of a network device that can be used to implement various embodiments. Specific network devices may utilize all of the components shown, or only a subset of the components, and levels of integration may vary from device to device. Furthermore, the network device 800 may contain multiple instances of a component, such as multiple processing units, processors, memories, transmitters, receivers, etc. The network device 800 may comprise a processing unit 801 equipped with one or more input/output devices, such as network interfaces, storage interfaces, and the like. The processing unit 801 may include a central processing unit (CPU) 810, a memory 820, a mass storage device 830, and an I/O interface 860 connected to a bus 870. The bus 870 may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. In one embodiment, the memory 820 includes an estimating module 820A that estimates a first execution time of code for at least one database query without applying a code generation method and in response to receiving the at least one database query and, for one or more code generation methods, a compilation cost and a second execution time of the code as modified by the code generation methods is estimated, a calculating module 820B that calculates a cost savings for each of the one or more code generation methods, the cost savings calculated as the first execution time less the second execution time of the code generation method, less the compilation cost of the code generation method, a comparing module 820C that compares the cost savings of the current one or more code generation methods to the cost savings of a previously calculated one or more code generation methods or the cost savings of the code without applying the code generation method, a selection module 820D that selects among one of the code generation methods and the no code generation method having a highest cost savings, and an executing module 820E that executes the code by calling the common function, wherein the common function is called inside a loop with a number of iterations equal to a number of the multiple operators in the at least one database query.

The mass storage device 830 may comprise any type of storage device configured to store data, programs, and other information and to make the data, programs, and other information accessible via the bus 870. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

According to the embodiments, the disclosed technology provides the following advantages, including, but not limited to, a cost based code generation method that achieves the best solution for JIT compiled execution, where the most cost effective method of code generation for a specific query and data size is selected. Grouping code generation may be implemented in order to reduce compilation cost (i.e., one method of code generation for the cost model). Moreover, the cost model can choose the best solution between JIT compiled execution or no code generation.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for query compilation in a database management system, comprising:

estimating a first execution time of code for at least one database query without applying a code generation method and in response to receiving the at least one database query;

for one or more code generation methods, estimating a compilation cost and a second execution time of the code as modified by the code generation method;

calculating a cost savings for each of the one or more code generation methods, the cost savings calculated as the first execution time less the second execution time of the code generation method, less the compilation cost of the code generation method; and selecting among one of the code generation methods and the no code generation method having a highest cost savings, wherein the one or more code generation methods are based on one or more optimizations to the code, the one or more optimizations including a just-in-time (JIT) compilation method.

2. The method of claim 1, further comprising:
comparing the cost savings of the one or more code generation methods to a previously calculated cost savings of the one or more code generation methods or the cost savings of the code without applying the code generation method, and
wherein the highest cost savings is determined as the one or more code generation methods that is greater than the cost savings of a previously calculated one or more code generation methods or the cost savings of the code without applying the code generation method.

3. The method of claim 1, wherein the one or more optimizations to the generated code comprises performing at least one of register allocation, in lining, constant folding, loop strength reduction, or loop-invariant code motion.

4. The method of claim 1, further comprising:
setting the cost savings of the code applying the no code generation method to zero; and
estimating the first execution time of the code based on a data size of a workload the code is set to process.

5. The method of claim 4, further comprising:
receiving the at least one database query;
processing the at least one database query by executing the code generated with the selected code generation method or no code generation method; and
outputting a result for the at least one database query based on the processed at least one database query.

6. The method of claim 1, wherein the code is generated by at least one of C, C++ and low level virtual machine (LLVM) intermediate representation (IR).

7. The method of claim 1, further comprising:
grouping multiple operators for a specific one of the at least one database query to generate a common function with parameters for different operators; and
executing the code by calling the common function, wherein the common function is called inside a loop with a number of iterations equal to a number of the multiple operators in the at least one database query.

8. A device for query compilation in a database management system comprising:
a non-transitory memory storage comprising instructions; and
one or more processors in communication with the memory, wherein the one or more processors execute the instructions to perform operations comprising:
estimating a first execution time of code for at least one database query without applying a code generation method and in response to receiving the at least one database query;
for one or more code generation methods, estimating a compilation cost and a second execution time of the code as modified by the code generation method;
calculating a cost savings for each of the one or more code generation methods, the cost savings calculated as the first execution time less the second execution time of the code generation method, less the compilation cost of the code generation method;
selecting among one of the code generation methods and the no code generation method having a highest cost savings;
comparing the cost savings of the one or more code generation methods to a previously calculated cost savings of the one or more code generation methods or the cost savings of the code without applying the code generation method; and
wherein the highest cost savings is determined as the one or more code generation methods that is greater than the cost savings of a previously calculated one or more code generation methods or the cost savings of the code without applying the code generation method.

9. The device of claim 8, wherein the one or more code generation methods are based on one or more optimizations to the code, the one or more optimizations including a just-in-time (JIT) compilation method.

10. The device of claim 9, wherein the one or more optimizations to the generated code comprises performing at least one of register allocation, in lining, constant folding, loop strength reduction, or loop-invariant code motion.

11. The device of claim 8, wherein the one or more processors further execute the instructions to perform operations comprising:
setting the cost savings of the code applying the no code generation method to zero; and
estimating the first execution time of the code based on a data size of a workload the code is set to process.

12. The device of claim 11, wherein the one or more processors further execute the instructions to perform operations comprising:
receiving the at least one database query;
processing the at least one database query by executing the code generated with the selected code generation method or no code generation method; and
outputting a result for the at least one database query based on the processed at least one database query.

13. The device of claim 8, wherein the code is generated by at least one of C, C++ and low level virtual machine (LLVM) intermediate representation (IR).

14. The device of claim 8, wherein the one or more processors further execute the instructions to perform operations comprising:
grouping multiple operators for a specific one of the at least one database query to generate a common function with parameters for different operators; and
executing the code by calling the common function, wherein the common function is called inside a loop with a number of iterations equal to a number of the multiple operators in the at least one database query.

15. A non-transitory computer-readable medium storing computer instructions for query compilation in a database management system, that when executed by one or more processors, perform the steps of:
setting a cost savings of code for at least one database query, without applying a code generation method, to zero;
estimating a first execution time of the code and in response to receiving the at least one database query, wherein the code is based on a data size of a workload the code is set to process;
for one or more code generation methods, estimating a compilation cost and a second execution time of the code as modified by the code generation method;
calculating a cost savings for each of the one or more code generation methods, the cost savings calculated as the first execution time less the second execution time of the code generation method, less the compilation cost of the code generation method; and
selecting among one of the code generation methods and the no code generation method having a highest cost savings.

16. The non-transitory computer-readable medium of claim 15, when further executed by one or more processors, perform the steps of:
- comparing the cost savings of the one or more code generation methods to a previously calculated cost savings of the one or more code generation methods or the cost savings of the code without applying the code generation method, and
- wherein the highest cost savings is determined as the one or more code generation methods that is greater than the cost savings of a previously calculated one or more code generation methods or the cost savings of the code without applying the code generation method.

17. The non-transitory computer-readable medium of claim 15, wherein when executed by one or more processors, perform the steps of:
- receiving the at least one database query;
- processing the at least one database query by executing the code generated with the selected code generation method or no code generation method; and
- outputting a result for the at least one database query based on the processed at least one database query.

18. The non-transitory computer-readable medium of claim 15, wherein when executed by one or more processors, perform the steps of:
- grouping multiple operators for a specific one of the at least one database query to generate a common function with parameters for different operators; and
- executing the code by calling the common function, wherein the common function is called inside a loop with a number of iterations equal to a number of the multiple operators in the at least one database query.

* * * * *